Figure 1:
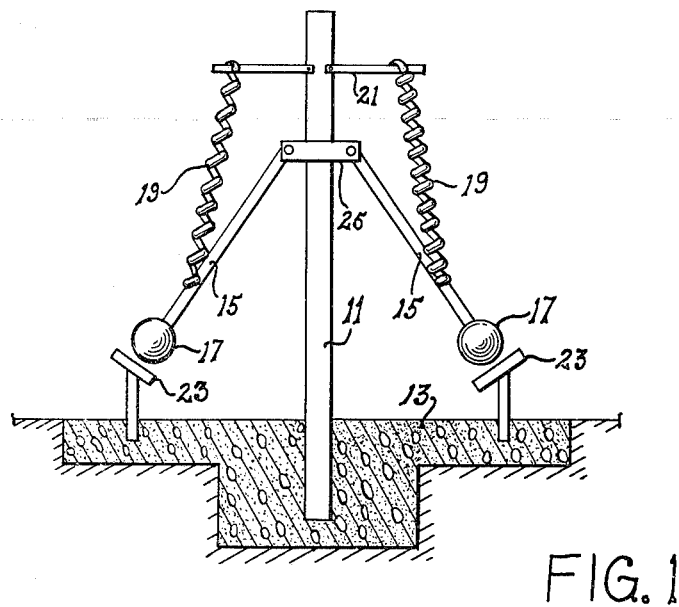

Dec. 7, 1965  B. S. MELTON  3,222,636
ANGULAR COMPOSITE SEISMOMETER
Filed March 1, 1963  3 Sheets-Sheet 1

INVENTOR.
BENJAMIN S. MELTON
BY
ATTORNEYS

INVENTOR.
BENJAMIN S. MELTON
BY
ATTORNEYS

United States Patent Office 3,222,636
Patented Dec. 7, 1965

3,222,636
ANGULAR COMPOSITE SEISMOMETER
Benjamin S. Melton, 3921 Mayfair Lane, Alexandria, Va.
Filed Mar. 1, 1963, Ser. No. 262,274
13 Claims. (Cl. 340—17)
(Granted under Title 35, U.S. Code (1952), sec. 266)

The invention described herein may be manufactured and used by or for the United States Government for governmental purposes without payment to me of any royalty thereon.

The present invention relates to a seismometer, the sensing element of a seismograph, and more particularly to a seismometer which will measure movements of the earth (or artificial structures) in three dimensions.

The usual seismometer measures movement in a single direction, vertical or horiontal as the case may be, and several units must be oriented with respect to each other to obtain a three-dimensional indication. Common practice is to use one vertical sensing seismometer, a mass suspended by one or more springs against the force of gravity, and two horizontal sensing seismometers, oriented at right angles. The horizontal sensing devices do not require springs to counteract the force of gravity, so they may be built as simple pendulums, and in any case their design is markedly different from the vertical sensing device. Many such units, for both vertical and horizontal sensing, are described in the literature and will not be further described here. For the purpose at hand, it is only necessary to recognize that any seismometer consists of an inertial mass, suspended more or less flexibly in a frame which rests on the earth or some artificial structure, and that the motions of the frame, observed by sensing its relation to the mass, which tends to remain in a fixed position, provide a means of observing vibrations of the earth or artificial structure.

The present invention differs from all previous seismometers in that it is essentially a symmetrical system, employing springs and inertial masses in a configuration readily useful for sensing translational components in any three directions not in the same plane, a necessary and sufficient condition for sensing along any desired axis. The symmetrical system is achieved by suspending three inertial masses by linkage members and springs in a manner such that each mass is constrained to move in a direction perpendicular to the allowed directions of the other two masses and all three of the direction axes are oriented to make their inclination from the horizontal the same. Ideally, the angle from the horizontal would be the arcs in $1/\sqrt{3}$ or 35.3°, which hereinafter will be approximated at 35 degrees. This an angle which permits mutually perpendicular directions. It remains to sense the motions of the inertial masses relative to the frame, and, if desired, to translate these motions into the more conventional vertical and horizontal directions. Sensing the motion of a given mass relative to the frame can be achieved by employment of any motion-sensing or position-sensing transducer. Examples of these are a coil moving in a magnetic flux field to generate a voltage; and a variable capacitance formed by a set of plates fastened to the mass, moving with respect to another set fastened to the frame. Assuming that coil and flux field transducers are employed, it is then possible, through simple resistive networks, to obtain terminal voltages proportional to rates of translation in any chosen direction. Conventionally, these could be the vertical and two horizontal directions at right angles. It is to be understood that the principle of the invention applies to and can be adapted for measurement of the movements of any mass or body and is not limited to seismographic measurement.

Figure 2:
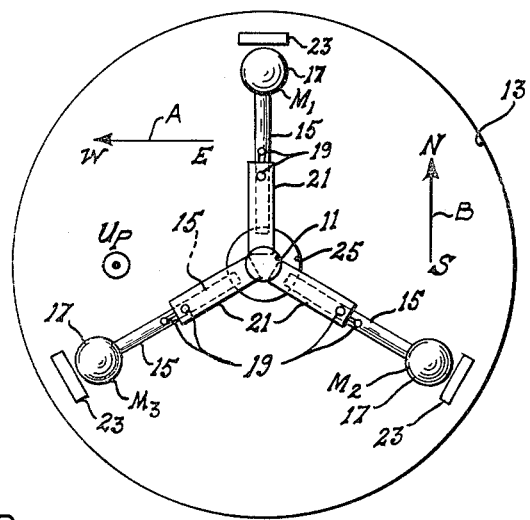
Figure 5:
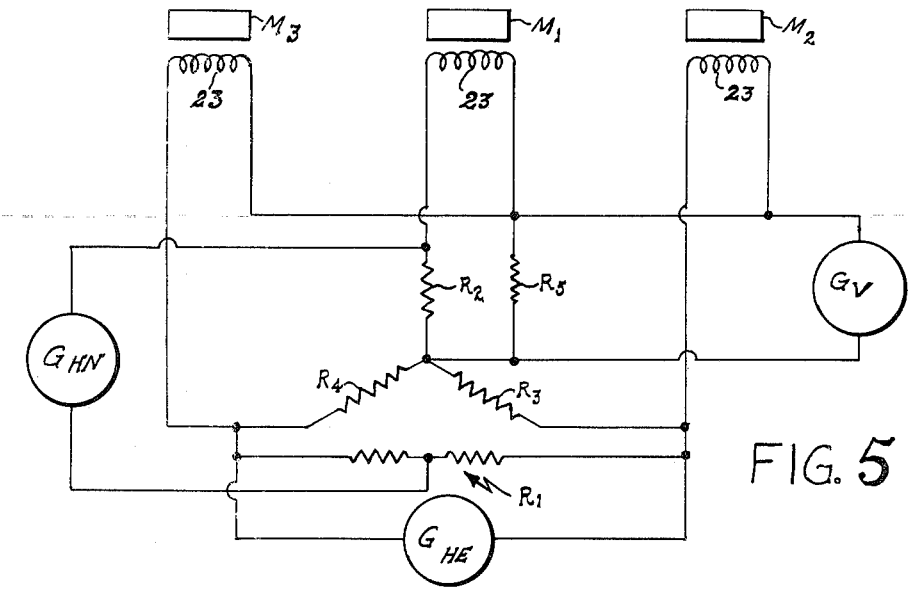
Figure 4:
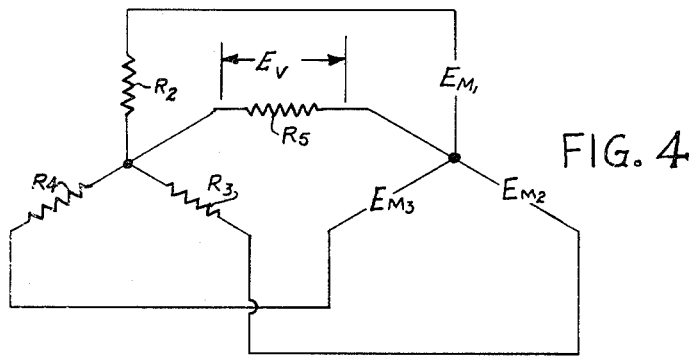
Figure 3:
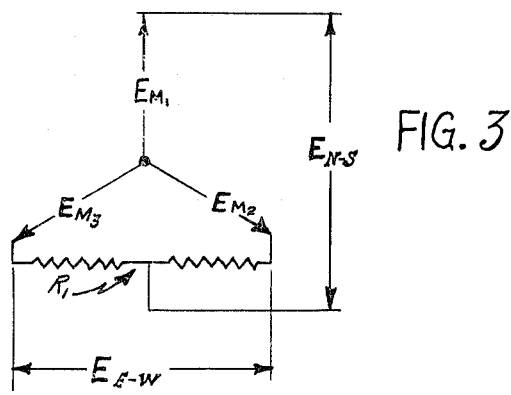
Figure 6:
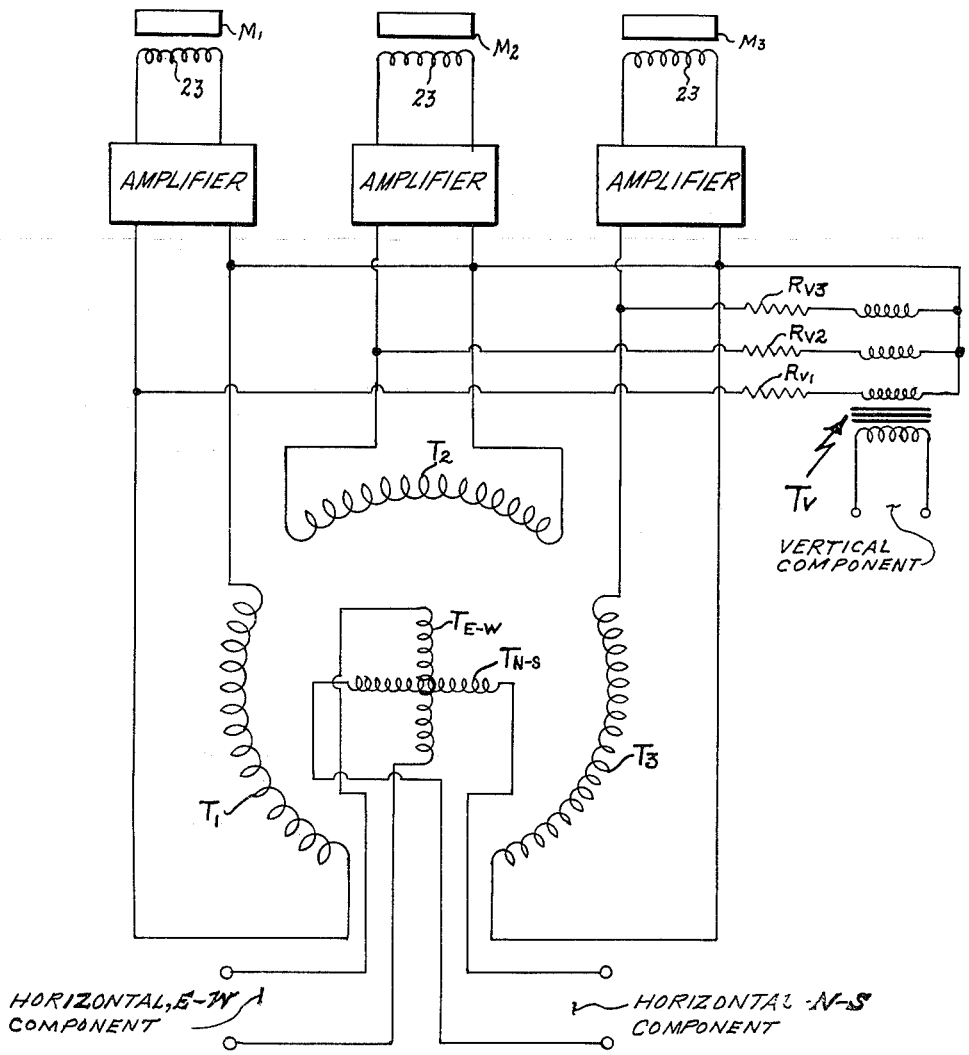

FIGURE 1 is a diagrammatic side elevation view of the mechanical arrangement of the present seismometer;
FIGURE 2 is a diagrammatic top plan view;
FIGURE 3 is a schematic representation of the electrical resolution of North-South, East-West, earth movement;
FIGURE 4 is a representation similar to FIGURE 3, showing the electrical resolution of vertical earth movements;
FIGURE 5 shows a diagrammatic wiring scheme combining the resolution capabilities of FIGURES 3 and 4; and
FIGURE 6 shows another possible resolution and translation of mechanical motions of the tri-axial seismometer.

The seismometer comprises a vertical support 11 mounted in a base 13, which is illustrated in FIGURE 1 as a concrete foundation. Carried by the support axis 11 are three arms 15, each having at its outer end a weight or mass 17 secured thereto. Springs 19 are secured between the arms 15 and the upper support arms 21 and are adjusted to support the arms 15 in positions allowing mutually perpendicular motions. It can be readily shown by mathematics or graphics that, in a plan view, such arms are 120° apart and in a side elevation through one of the arms, are approximately 55° below the horizontal, the direction of motion permitted to the mass being approximately 35° to the horizontal. A transducer 23 is positioned adjacent each mass 17. The mounting of the transducer may be by any expedient means. In FIGURE 1, for example, it is secured to the base 13 so as to produce a voltage having a magnitude proportional to the velocity of movement of the mass relative to its transducer and a polarity indicating the direction of such movement. It is to be understood that the elements of the position sensing devices are interchangeable, i.e., the coils may be either on the moving weights or fastened to the base of the instrument. The magnet would in either case be on the other part.

It may be considered that the earth, the central support and the earth supported transducers constitute a frame with the inertial masses resiliently supported therein.

Obviously, the three arms may also be arranged above the horizontal in a somewhat different structure, and the transducers would then be in an elevated position. In fact, the essence of this invention is the distribution of inclined motion sensing components about a vertical axis of symmetry so that their rest positions are influenced to essentially the same amount by gravity, yet in such a manner that motions along orthogonal directions may be properly sensed.

It should be noted that the voltages produced by the transducers commence at the same instant, and that there is hence no "phase" as in the usual three-phase alternating current circuits. All voltages from the transducers 23 are either in phase or anti-phase, and have a frequency determined by the mechanical frequency of the movement of the earth.

The arms 15 are secured to the support 11 by hinges 25 which have horizontal axes perpendicular to the arms. The hinges 25 serve to restrict the movements of the masses 17 and the arms 15 to single, vertical planes passing through the support perpendicular to the respective hinge axes. The hinges 25 with the arms 15 and masses 17 serve as mechanical resolvers to cause the transducers 23 to produce voltages indicative of movements in three defined vertical planes equiangularly disposed relative to each other as viewed from above.

For the purpose of illustration, it is assumed that the vertical plane of motion of one arm is aligned with the North-South meridian so that an East-West vertical plane passes through the masses 17 of the other two arms.

Referring to FIGURE 2, if there is a motion of the support 11 in a westerly direction, as shown by the arrow labeled A, the mass attached to the arm, indicated by $M_1$, in the North-South plane, will be forced to move with the support and hence produce no output at the associated transducer 23. However, the mass $M_2$ will swing away from the support 11 in an upward arc, and the mass $M_3$ will swing toward the support in a downward arc.

However, should the movement occur in a northerly direction as illustrated by the arrow B in FIGURE 2, the mass $M_1$ will swing in a downward arc toward the support 11, while the masses $M_2$ and $M_3$ will swing away from the support. Movement of the earth causes mass movements modified in amplitude by the mechanical resolution of the angles between the hinge axes and the direction of the motion.

When there is a vertical motion of the support 11 without a horizontal motion, all three masses $M_1$, $M_2$ and $M_3$ swing away from or toward the support in unison. The transducers thus produce equal voltages of the same polarity.

The movement of the masses relative to their transducers produces signals which must then be resolved to present readings indicative of the motion sensed by the seismometers.

Assume the voltages produced by the transducers 23 are positive when the movement of the associated mass 17 is away from the support 11 and negative when the movement is toward the support. When a motion in a North-South direction occurs, a voltage responsive device connected to $E_{N-S}$ in FIGURE 3 (between $E_{M1}$ and the center-tap of resistor $R_1$ will indicate the quantity $$E_{M1} - \left(\frac{E_{M2} + E_{M3}}{2}\right)$$

Since the voltages $E_{M2}$ and $E_{M3}$, because of motion direction, are opposite to $E_{M1}$, they average and add to $E_{M1}$ to produce $E_{N-S}$. When movement occurs only in an East-West direction, $E_{M1}$ will be zero, while the voltages $E_{M2}$ and $E_{M3}$ will be finite because of motion components in the transducers, and will add to create the voltage $E_{E-W}$. For the arrangement shown in FIGURE 3 the geometry is such that a pure North-South motion will produce a voltage $E_{N-S}$ which is 1.5 times $E_{M1}$, and a voltage $E_{E-W}$ which is zero. A pure East-West motion will produce a voltage $E_{E-W}$ twice $E_{M2}$ or $E_{M3}$ and a zero voltage for $E_{N-S}$.

FIGURE 4 shows a mesh of resistors connected to permit measurement of vertical motion. Resistors $R_2$, $R_3$ and $R_4$ each have one end connected to the voltage output of a transducer which is illustrated in accordance with the voltage component being measured. The other ends are connected together and to one end of $R_5$, is connected to a common connection of the three transducers. Under these conditions, the current through $R_5$ is proportional to the sum of $E_{M1}$, $E_{M2}$ and $E_{M3}$. For pure vertical motion, these voltages will be exactly equal and in phase so that the voltage drop across $R_5$ is proportional to the vertical motion. However, for pure horizontal motion in any direction the voltage components will add in a manner to make the drop across resistor $R_5$ equal to zero.

The embodiment of FIGURE 5 represents a combination of FIGURES 3 and 4 where $G_{HN}$ represents a galvanometer reading the horizontal component in the North-South direction, $G_{HE}$ reads the voltage representing the horizontal component in the East-West direction, and $G_V$ represents a galvanometer reading the vertical motion in terms of a voltage.

Through incorporation of a more complex resistive network (not shown) comprised of commercially available "sine-cosine" function potentiometers, it is possible to create an arrangement which makes use of the three voltages $E_{M1}$, $E_{M2}$ and $E_{M3}$ to provide three other voltages, $E_a$, $E_b$ and $E_c$, representing orthogonal directions of any other orientation desired. In particular, customary seismological practice decrees the use of a vertical component, a North-South horizontal component and an East-West horizontal component, yet it might be inconvenient to orient the angular composite seismometer with some one component pointing in a cardinal compass direction.

The foregoing description of electrical circuit arrangements for obtaining desired components of motion has, for simplicity, avoided incorporation of amplifiers or other devices useful to preclude undesired interaction of electrical circuits, one on another. In practice, amplifiers would ordinarily be required and their signal inputs would probably be the direct electrical outputs of the motion transducers. Outputs from these amplifiers would then be connected into the electrical resolving circuits, or could be recorded for later playback and electrical resolution as desired.

It is conceivable that the seismometer may be emplaced without reference to azimuth, and yet provide North-South and East-eWst components electrically, by combining their magnetic field to produce a single resultant field, whose direction components are then resolved.

As a practical matter, the seismometer might be lowered into a hole to avoid undesired surface disturbances. In such a case its orientation could be determined by setting off a small explosion in a known direction and recording the result. Then the electrical resolving network, either resistive or electromagnetic, could be adjusted to yield the desired direction components as appropriate voltages.

Because temperature changes can affect the rest position of any seismometer, due to their effect on springs and other supporting members, a means of temperature compensation is offered by constructing the support 11 of dissimilar metals, and forming the upper support levers 21 of shiftable levers which compensate for unequal expansion of the parts of the support.

The present seismometer is somewhat less sensitive to variations of level than conventional horizontal seismometers. This improvement results from the inclination of the arms 15 from the horizontal. The displacement of an arm from its position of rest is the result of a force which varies as the sine of the angle between the horizontal and the direction of motion permitted. Therefore, when motion is permitted at an angle of 35° and this angle is altered slightly, the displacing force is about 81% of that which would occur if the allowed motion direction were horizontal. While this is not a large factor, it nevertheless eases the emplacement problem, or lessens the problem of linear range required of the transducer, and therefore constitutes a considerable advantage accruing to this novel design.

In FIGURE 6 there is shown another of the possible arrangements for electrical resolution of the output from the transducers. In this embodiment, amplifiers receive the direct electrical output from the motion transducers 23. The output from the amplifiers is then connected to a resolving circuit which comprises a rotatable transformer having its three coils $T_1$, $T_2$ and $T_3$ oriented such that the magnetic field produced from each transformer is combined to produce a single, resultant field whose direct components are then resolved by the right angle coils $T_{E-W}$ and $T_{N-S}$, thereby providing the desired horizontal components. The output from the amplifiers is also applied to isolation resistors $R_{V1}$, $R_{V2}$ and $R_{V3}$ from which the signal is applied to windings on a transformer $T_V$, wherein the combined output is presented at the output is presented at the output of the transformer and represents the vertical earth movement.

As before mentioned, the elements of the transducers 23, that is, the magnets and the coils, may be incorporated, as found expedient, interchangeably on the inertial mass or the "moving" element.

Although the invention has been described with reference to particular embodiments, it will be understood to those skilled in the art that the invention is capable of a variety of alternative embodiments within the spirit and scope of the appended claims.

I claim:

1. A sensing device for sensing and measuring movements of a body in all directions, said device comprising a central support member secured to, arising vertically from, and movable with the body whose movement is to be measured; said support member forming a central axis; three arms, each attached to said central support by means of a horizontally disposed hinge, said arms being disposed radially in symmetry about said central support at an inclination to the horizontal; inertial masses secured to the outer ends of each of said arms; an upper support member, rigidly secured to said central support and located a distance above said hinges, each of said arms being resiliently supported from said second support in a position of rest at an incline to the horizontal so that each inertial mass is capable of upward and outward movement and downward and inward movement responsive to stresses applied thereto by movement of said body; and a transducer for each mass for converting the velocity of movement of said mass into measurable voltages, the direction of movement being indicated by the vector sum of the movement of the three masses.

2. A seismometer for measuring the amount and direction of earth movements, said seismometer comprising a central axis support attached to the earth and arising vertically therefrom; three masses secured to said central support by means of horizontally disposed pivots and being resiliently movable in vertical arcs in response to stress placed thereon by movement of the earth; and transducer means for converting the movement of each mass into measurable voltage changes.

3. A symmetrical system for measuring movements of a body in three dimensions, said system comprising a central support rising vertically from the body whose movements are to be measured; inertial masses equiangularly arranged symmetrically about said central support and attached thereto for arcuate movement, the movement of each being confined to one vertical plane, said masses being resiliently suspended from said central support to present identical resistances to gravity; and elements rigidly secured to said body for movement therewith, said elements being located adjacent each inertial mass and forming therewith transducers, each transducer so formed capable of translating relative movements of said masses and said elements into measurable voltage variations.

4. A unitary system for sensing and measuring movements of a body in three dimensions, said system comprising a frame attached to said body and movable therewith, three inertial masses resiliently suspended within said frame and arcuately movable each in a single vertical plane with said planes meeting at horizontal angles of 120° each, and elements forming portions of said frame and so equipped and positioned with reference to each of said masses as to form therewith transducers for translating the movements of said masses into measurable voltage variations.

5. A system as defined in claim 4 including means responsive to said voltage variations for resolving said voltage variations into desired directional components of the body.

6. A seismometer comprising a central, vertically positioned axis support having its foundation in the earth; three inertial mass elements resilently suspended from said support and attached to said support for arcuate movement toward and away from said axis, each in a single vertical plane, said planes meeting in said axis support and forming horizontal angles of 120° about said axis; and movement sensing elements, rigid with said earth foundation and movable therewith, said sensing elements forming transducers with said masses for translating relative movement of said masses and said sensing elements into three measurable voltages, said voltages being proportional to the velocity and extent of said relative movement, and each voltage value representing also a direction of relative movement.

7. A device for measuring movements of a body such as a seismometer for measuring movements of the earth comprising a central support attached to said body and movable therewith, a plurality of inertial masses for sensing movement of said body in any direction, means for attaching said inertial masses to said central support for allowing relative movement of said masses toward or away from said central support, said means comprising an arm attached to each of said masses at the distal end thereof and hinged to said support by means of a horizontally pivoted hinge attachment to said central support, each of said arms being resiliently maintained in a position of inclination to the horizontal, a transducer element in each of said masses, and complementary transducer elements provided for each mass and positioned to move with said body, a transducer being thus provided for converting movements of said masses relative to said body into direction oriented varying potentials proportional to the relative movement of said masses and said body.

8. In a seismometer, inertial masses for sensing omnidirectional earth movements, a central support attached to the earth and movable therewith, a plurality of inertial masses, and means for attaching said inertial masses to said central support, said means comprising an arm supporting each of said masses, each arm being attached to said support by a horizontally pivoted hinge, and each arm being resiliently supported in an angle of inclination to the horizontal, of the order of 35° so that each mass may move toward and away from said support in response to earth movements.

9. In a device for sensing omnidirectional movements of a body, a central support member attached to said body and movable therewith, three inertial masses, an arm supporting each of said masses, each arm being attached to said support by a horizontally pivoted hinge, said three arms being spaced 120° measured in a horizontal plane, and means for resiliently maintaining said arms at an angle of inclination below the horizontal, of the order of 55°.

10. A device according to claim 9 wherein said means comprises a second support member secured to said central support and located a distance above said hinge, and springs attached to said second support and to each arm.

11. A system for sensing and measuring movements of a body, and their direction, through measurement of vertical movements of inertial masses, said masses being positioned with specific relation to chosen orthogonal directions, said system comprising an axis support attached to and arising vertically from said body and movable therewith, suspension means for suspending said inertial masses at equally spaced angles about said axis support, said angles being measured in a plane normal to said axis support, said inertial masses being movable in response to movements of said bodies toward and away from said axis support and confined in a plane passing through said axis support, and means for translating the movement of each of said bodies into measurable electrical potentials.

12. A system as defined in claim 11 including electrical means responsive to said last-mentioned means for resolving said electrical potentials into readings corresponding to the movement of said body in two mutually perpendicular horizontal planes of reference and a vertical plane of reference.

13. The sensing element of a seismometer which comprises a vertically positioned axis member rigid with the earth or other body whose movements are to be measured and movable therewith, arms attached to said axis member at one extremity of each by means of a horizontally pivoted hinge, said arms extending radially from said axis member at equal angles, said angles being measured in a plane normal to said axis member, an inertial mass attached to the outer end of each of said arms, and resilient means for maintaining each of said arms when in unstressed condition at an angle of the order of 55° below the horizontal so that stress placed on said inertial masses by movement of said body will cause relative movement of said masses with respect to said axis.

No references cited.

BENJAMIN A. BORCHELT, *Primary Examiner.*